United States Patent [19]
Stenstrom et al.

[11] Patent Number: 5,635,074
[45] Date of Patent: Jun. 3, 1997

[54] METHODS AND SYSTEMS FOR CONTROLLING A CONTINUOUS MEDIUM FILTRATION SYSTEM

[75] Inventors: Michael K. Stenstrom, Los Angeles, Calif.; Bruce E. Stuckman, Algonquin, Ill.; Cary D. Perttunen, Shelby Township, Mich.

[73] Assignee: Motorola, Inc., Schaumburg, Ill.

[21] Appl. No.: 393,613

[22] Filed: Feb. 23, 1995

[51] Int. Cl.⁶ .......................... B01D 17/12; B01D 33/048
[52] U.S. Cl. .................. 210/739; 210/87; 210/90; 210/103; 210/400; 210/741; 210/783
[58] Field of Search .................. 210/85–87, 90, 210/94, 134, 137, 143, 387, 400, 401, 739, 741, 745, 770, 780, 783, 194, 805, 103; 73/861.08

[56] References Cited

U.S. PATENT DOCUMENTS

| | | |
|---|---|---|
| 3,631,982 | 1/1972 | Lejeune ................................ 210/400 |
| 3,741,865 | 6/1973 | Lejeune ................................ 210/400 |
| 4,341,628 | 7/1982 | Fujinami et al. ...................... 210/401 |
| 4,621,123 | 11/1986 | Eustacchio et al. ................... 210/401 |
| 5,021,166 | 6/1991 | Torpey ................................. 210/400 |
| 5,133,872 | 7/1992 | Baldwin et al. ........................ 210/783 |
| 5,256,288 | 10/1993 | Lee ................................ 210/321.61 |
| 5,259,952 | 11/1993 | Lee .................................... 210/137 |
| 5,292,438 | 3/1994 | Lee .................................... 210/504 |
| 5,411,669 | 5/1995 | Narath ................................. 210/780 |
| 5,492,632 | 2/1996 | Reber ................................. 210/400 |

*Primary Examiner*—Joseph W. Drodge
*Attorney, Agent, or Firm*—Bruce E. Stuckman; Jeffrey G. Toler

[57] ABSTRACT

A plurality of sensors sense a plurality of parameters including flow rate of a slurry being filtered sensed along a filtration medium and differential pressure across the medium which characterize the operation of a cross-flow filtration system having a moving, continuous filter medium. The plurality of sensors produce a plurality of signals representative of the plurality of parameters. A processor processes the plurality of signals to provide at least one control signal. The at least one control signal is applied to the filtration system to control at least one parameter thereof. As a result, a desired operating condition or a desired performance criterion is automatically maintained during operation of the filtration system.

48 Claims, 5 Drawing Sheets

METHODS AND SYSTEMS FOR CONTROLLING A CONTINUOUS MEDIUM FILTRATION SYSTEM

RELATED INVENTIONS

The present invention is related to the following invention which is assigned to the same assignee as the present invention:

"Method and System for Monitoring and Controlling a Filtration Process" having Ser. No. 08/311,305 filed on Sep. 23, 1994, now U.S. Pat. No. 5,492,632.

The subject matter of the above-identified related invention is incorporated by reference hereby into the disclosure of this invention.

FIELD OF THE INVENTION

The present invention relates to continuous medium filtration systems which separate a solid material from a liquid material contained in a slurry.

BACKGROUND OF THE INVENTION

Many industrial processes result in the creation of liquid waste. Liquid waste may be in forms such as an unwanted process byproducts, used or contaminated solvents, and/or used or contaminated lubricants. Waste water is an example of liquid waste which is produced in various industrial processes. In many food canning processes, for example, a salt water byproduct is produced. Waste water is also a byproduct in paper production processes, and in bleaching and dying processes used by the textile industry in the manufacture of garments. Other applications in which waste water is produced include sewage processing and food processing.

Typically, liquid waste is treated before subsequent disposal, recycling, or reuse thereof. One method of treatment entails diluting the liquid waste until a level of contaminants contained therein meets a predetermined standard. Thereafter, the diluted liquid waste is typically disposed into a nearby stream or lake. This solution is not environmentally sound since the contaminants introduced into the environment may be accumulative.

U.S. Pat. Nos. 5,292,438, 5,256,288, and 5,259,952, issued to Lee and assigned to Cer-Wat, Inc., disclose methods and systems for separating a solid material and a liquid material contained in a slurry. A filtration system disclosed therein utilizes a continuous filtration medium, such as a traveling belt filter, on which a cake of the solid material forms within a separation chamber. This system may be utilized for treating liquid waste by filtering out the contaminants contained therein. Both the contaminants and the filtered liquid may then be reused or recycled.

Further disclosed in U.S. Pat. No. 5,259,952 is an open-loop control system for controlling parameters of the filtration system. The open-loop control system commands the parameters to provide desirable steady-state separation conditions for a given slurry. However, the use of open-loop control results in a system which does not necessarily provide desirable transient separation conditions. Further, the open-loop control system is not capable of adapting the commands to changing conditions, such as a change in the concentration of solid material contained within the slurry.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of the present invention advantageously utilize closed-loop control methods and systems for controlling the operation of a filtration system which employs a moving continuous filter medium. Consequently, the filtration system is robust to changing conditions which heretofore would have required intervention of an operator. As a result, the filtration system may be operated remotely.

Figure 1:
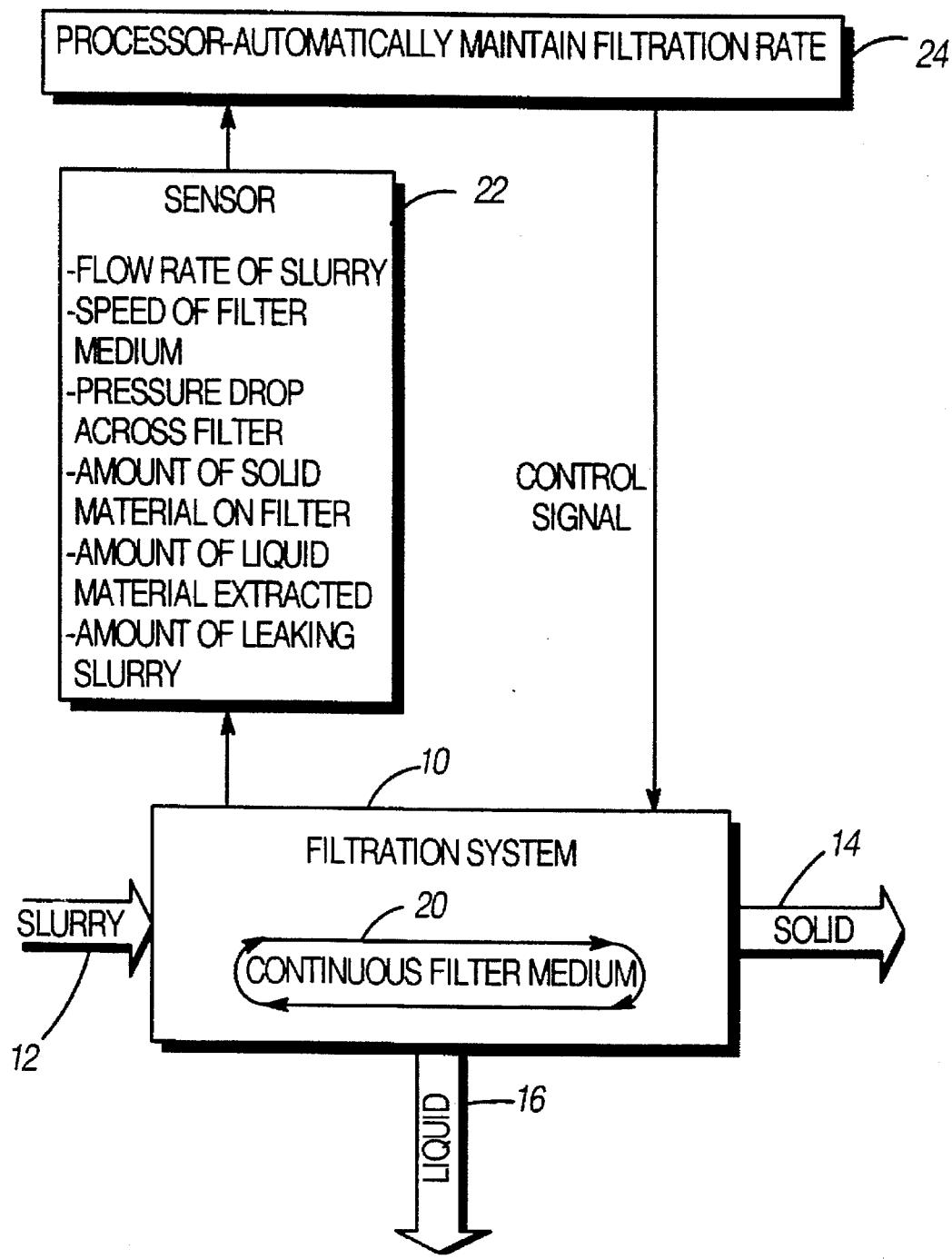
FIG. 1 is a block diagram of an embodiment of a system for controlling a filtration system.

FIG. 1 is a block diagram of an embodiment of a system for automatically controlling a filtration system 10. The filtration system 10 receives a slurry 12, and separates a solid material 14 from a liquid material 16 contained in the slurry 12. The solid material 14 is separated from the liquid material 16 by a continuous filter medium 20. The liquid material 16 flows through the continuous filter medium 20, while the solid material 14 adheres to a surface of the continuous filter medium 20 to form a cake-like deposit.

The continuous filter medium 20 moves at a speed within the filtration system 10 such that the solid material 14 is transported out of the filtration system 10, and a clean surface of the continuous filter medium 20 is provided for filtering. The solid material 14 is continuously removed from the continuous filter medium 20 so that the surface may be returned for further filtration. As a result, filtration is performed continuously within the filtration system 10. Typically, the continuous filter medium 20 includes a continuous loop belt (not specifically illustrated) containing a foranimous medium.

The filtration system 10 has a plurality of parameters which characterize its operation. The parameters include the speed of the continuous filter medium 20, a flow rate of the slurry 12 over the continuous filter medium 20, an amount of the solid material 14 deposited on the continuous filter medium 20, an amount of liquid material 16 extracted from the slurry 12, and a pressure drop across the continuous filter medium 20.

A sensor 22 is utilized to sense a first parameter of the filtration system 10 during operation thereof, and to generate a signal based upon the first parameter. A processor 24, operatively associated with the sensor 22, produces a control signal in dependence upon the signal generated by the sensor 22. The control signal is applied to the filtration system 10 for controlling a second parameter during operation of the filtration system 10.

The second parameter is controlled to maintain a desired operating condition or performance criterion, such as a desired filtration rate or a desired process efficiency. In a cross-flow filtration system, the second parameter may be controlled to automatically maintain a cross-flow condition within a predetermined section of the filtration system. In many applications, the second parameter differs from the first parameter; e.g. the speed of the continuous filter medium 20 may be controlled based upon the flow rate of the slurry 12.

It is noted that the sensor 22 is representative of at least one sensor which senses at least one parameter of the filtration system 10 during operation thereof, and generates at least one signal based upon the at least one parameter. Further, the at least one sensor provides the at least one signal to the processor 24, which produces a control signal for controlling the filtration system 10. In preferred embodiments, the control signal is applied to the filtration system 10 for controlling the speed of the continuous filter medium 20. Here, it is preferred that the at least one parameter includes a parameter other than the speed of the continuous filter medium 20. In exemplary embodiments, a plurality of control signals are produced for controlling a plurality of parameters of the filtration system 10.

Figure 2:
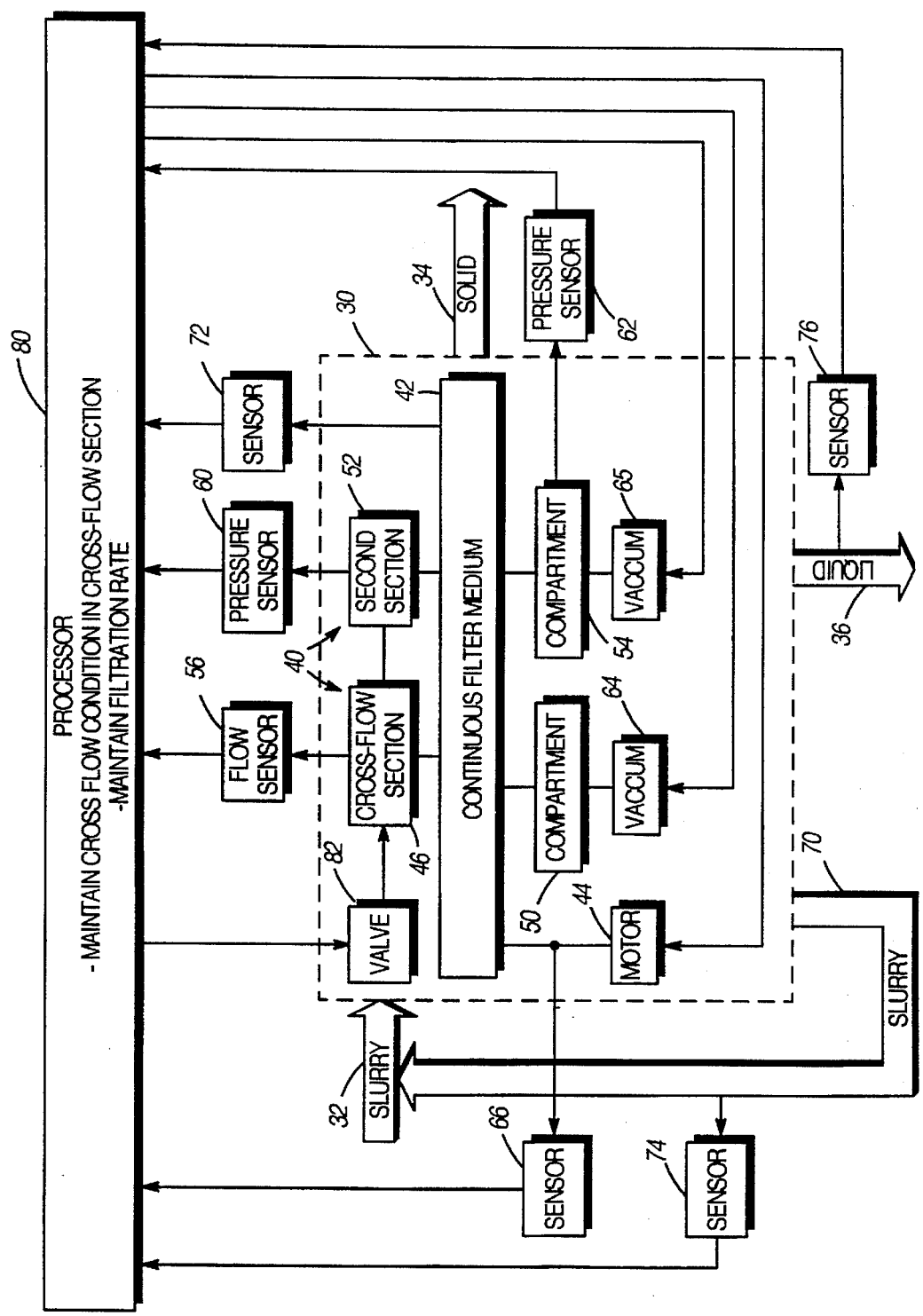
FIG. 2 is a block diagram of an embodiment of a system for controlling a cross-flow filtration system.

FIG. 2 is a block diagram of an embodiment of a system for controlling a cross-flow filtration system 30. In a preferred embodiment, the cross-flow filtration system 30 is embodied by one of the methods and systems described in U.S. Pat. Nos. 5,292,438, 5,256,288, and 5,259,952, which are incorporated herein by reference. Although the subsequent discussion is directed to the cross-flow filtration system 30, it should be understood that the teaching may be applied to any filtration system which utilizes a continuous filter medium.

The cross-flow filtration system 30 receives a slurry 32 and separates a solid material 34 from a liquid material 36 contained in the slurry 32. The cross-flow filtration system 30 defines a separation chamber 40 within which the slurry 32 is received and contained, and within which the solid material 34 is deposited on a continuous filter medium 42. The separation chamber 40 may be in the form of a box which sits above the continuous filter medium 42. A motor 44 drives the continuous filter medium 42 such that the continuous filter medium 42 moves at a speed relative to the separation chamber 40.

The separation chamber 40 includes a cross-flow section 46 within which the slurry 32 flows over the continuous filter medium 42 at a flow velocity generally greater than the speed at which the continuous filter medium 42 is moving. Having the flow velocity be sufficiently greater than the speed of the continuous filter medium 42 results in the creation of a cross-flow condition wherein the solid material 34 is prevented from settling onto the continuous filter medium 42. A compartment 50, located adjacent to the continuous filter medium 42, receives the liquid material 36 extracted through the continuous filter medium 42 within the cross-flow section 46 of the separation chamber 40.

The separation chamber 40 further includes a second section 52 wherein the flow velocity of the slurry 32 is not sufficient to create a cross-flow condition. As a result, the solid material 34 settles on the continuous filter medium 42 within the second section 52. A compartment 54, located adjacent to the continuous filter medium 42, receives the liquid material 36 extracted through the continuous filter medium 42 within the second section 52 of the separation chamber 40.

A sensor 56 senses the flow rate of the slurry 32 within the separation chamber 40. The flow rate of the slurry 32 is sensed along an axis generally parallel to an axis along which the continuous filter medium 42 is moving relative to the separation chamber 40. Preferably, the flow rate of the slurry 32 is sensed at a region of the separation chamber 40 where the slurry 32 flows at a speed generally greater than the speed at which the continuous filter medium 42 is moving. Here, the sensor 56 may be located within the cross-flow section 46 to sense the flow rate of the slurry 32 therewithin. Alternatively, the sensor 56 may be located within the second section 52 to sense the flow rate of the slurry 32 therewithin.

Various types of flow sensors may be utilized in the sensor 56. The sensor 56 may include a mechanical flow sensor such as a propeller, turbine, or cup assembly located within the separation chamber 40. Alternatively, the sensor 56 may include a thermal flow sensor or an ultrasonic flow sensor. In a preferred embodiment, the sensor 56 includes an electromagnetic flow sensor having an electromagnet which generates a magnetic field transverse to the axis along which the flow rate of the slurry 32 is sensed, and a voltage sensor which senses a voltage induced in the slurry according to Faraday's law. The voltage provides a signal representative of the flow rate.

Pressure sensors 60 and 62 are utilized to sense a pressure drop across the continuous filter medium 42. The pressure sensor 60 is positioned at a first location within the separation chamber 40. The pressure sensor 62 is positioned at a second location exterior to the separation chamber 40. As a result, a differential pressure, or pressure drop, may be sensed between the first location and the second location.

The pressure sensor 60 is located either within the cross-flow section 46 or within the second section 52 of the separation chamber 40 to sense a pressure exerted by the slurry 32 on the continuous filter medium 42. Preferably, the pressure sensor 62 is located either within the compartment 50 or within the compartment 54 to sense a reduced pressure beneath the continuous filter medium 42 produced by a vacuum 64 or a vacuum 65, respectively.

A sensor 66 senses the speed of the continuous filter medium 42 during operation of the cross-flow filtration system 30. Preferably, the sensor 66 senses the speed based upon an angular speed of either the motor 44 or a measuring roller (not specifically illustrated) mechanically coupled to the continuous filter medium 42. The sensor 66 generates a signal representative of the speed.

In some cross-flow filtration systems, the separation chamber 40 defines an opening, or a gap, through which the cake-like deposit of the solid material 34 on the continuous filter medium 42 exits. The size of the opening determines the efficiency of these cross-flow filtration systems. If the opening is too large, a slurry 70 leaks out of the opening. The slurry 70 must be transported back to a slurry-receiving input of the cross-flow filtration system 30, which results in a reduction in process efficiency. In contrast, if the opening is too small, the solid material 34 builds up within the separation chamber 40. As a result, the filtration rate of the system is reduced, requiring that the rate of slurry 32 applied to the filtration system be reduced.

In one embodiment of the present invention, a displacement sensor 72 senses an amount of the solid material 34 deposited on the continuous filter medium 42 during operation of the cross-flow filtration system 30. Preferably, the displacement sensor 72 senses a physical dimension, such as a thickness, of the solid material 34 deposited on the continuous filter medium 42. Further, it is preferred that the physical dimension of the solid material 34 is sensed exterior to the separation chamber 40 in proximity to the opening. In a preferred embodiment, the displacement sensor 72 includes an ultrasonic distancing sensor (not specifically illustrated) mounted above the continuous filter medium 42 in proximity to the opening. The ultrasonic distancing sensor is directed down toward the continuous filter medium 42 to sense the height of the solid material 34 deposited thereon.

In an alternative embodiment of the present invention, the displacement sensor 72 measures the gap or opening through which the cake-like deposit of the solid material 34 on the continuous filter medium 42 exits the separation chamber 40. In one embodiment, the displacement sensor is implemented using a linear variable displacement transformer coupled to the separation chamber 40, calibrated to yield a zero displacement reading when there is no gap or opening. Other displacement sensors can optionally be used including an ultrasonic or optical sensor or a simple mechanical gauge with an electronic interface.

A sensor 74 senses an amount of the slurry 70 which leaks through the opening. Preferably, the sensor 74 includes a flow sensor (not specifically illustrated) which senses the amount of the slurry 70 transported back to the slurry-receiving input, and produces a signal based thereupon.

To monitor the filtration rate and process efficiency of the cross-flow filtration system 30, a sensor 76 is included for sensing an amount of the liquid material 36 extracted from the slurry 32. The sensor 76 may include a flow sensor which senses a rate of extraction of the liquid material 36. Alternatively, a mass sensor, volume sensor, or weight sensor may be employed to sense an absolute measure of the liquid material 36 extracted.

The sensors 56, 60, 62, 66, 72, 74, and 76 sense a plurality of parameters of the cross-flow filtration system 30 during operation thereof, and generate a plurality of signals based upon the plurality of parameters. A processor 80, operatively associated with the sensors 56, 60, 62, 66, 70, 74, and 76, produces at least one control signal based upon the plurality of signals. The at least one control signal is applied to the cross-flow filtration system 30 for controlling at least one parameter thereof. The at least one parameter may be controlled to maintain a cross-flow condition within a predetermined section of the separation chamber, regulate a physical dimension of the solid material 34 deposited on the continuous filter medium 42, maintain a desired filtration rate, and/or maintain a desired efficiency of the cross-flow filtration system 30.

In a preferred embodiment, the at least one control signal includes a first control signal which is applied to an input of the motor 44. The first control signal is utilized to control the speed of the continuous filter medium 42 in order to maintain a cross-flow filtration condition within a predetermined section of the separation chamber 40. The predetermined section is typically within the cross-flow section 46 of the separation chamber 40.

The at least one control signal may include a second control signal which is applied to an input of the vacuum 64 or the vacuum 65 to control the pressure drop across the continuous filter medium 42. The pressure drop may be controlled to modify the conditions for cross-flow within the cross-flow section 46, to prohibit a cross-flow condition within the second section 52, and/or to improve the process efficiency.

The at least one control signal may include a third control signal which is applied to an input of a valve 82 to control the flow rate of the slurry 32 entering the separation chamber 40. The flow rate of the slurry 32 may be controlled to maintain a cross-flow condition within the cross-flow section 46 of the separation chamber 40, to regulate an amount of slurry 70 which leaks through the opening of the separation chamber 40, and/or to improve the process efficiency.

In exemplary embodiments, the processor 80 produces a plurality of control signals used to control a plurality of parameters of the cross-flow filtration system 30 during operation thereof.

Figure 3:
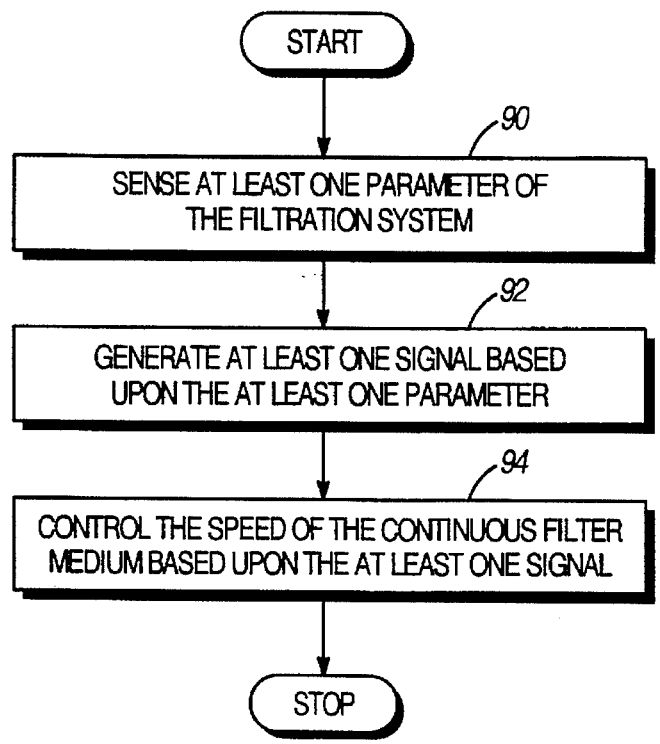
FIG. 3 is a flow diagram of an embodiment of a method of automatically controlling a filtration system.

FIG. 3 is a flow diagram of an embodiment of a method of automatically controlling a filtration system. As indicated by block 90, the method includes a step of sensing at least one parameter of the filtration system during operation thereof. The at least one parameter may include a flow rate of a slurry over a continuous filter medium, a speed at which the continuous filter medium is moving, a differential pressure between a first location and a second location separated by the continuous filter medium, an amount of the solid material deposited on the continuous filter medium, an amount of liquid material extracted from the slurry, a physical dimension of the solid material deposited on the continuous filter medium, and/or an amount of slurry which is transported back to a slurry-receiving input of the filtration system. Preferably, the at least one parameter includes a parameter other than a speed at which a continuous filter medium is moving within the filtration system.

As indicated by block 92, the method includes a step of generating at least one signal based upon the at least one parameter. Preferably, each of the at least one signal is either an analog or a digital electrical signal representative of a corresponding parameter.

The method further includes a step of controlling the speed of the continuous filter medium in dependence upon the at least one signal, as indicated by block 94. Preferably, the steps indicated by blocks 90, 92, and 94 are performed repeatedly during operation of the filtration system in order to automatically maintain a desired operating condition or a desired performance criterion, such as a desired filtration rate or efficiency.

Figure 4:
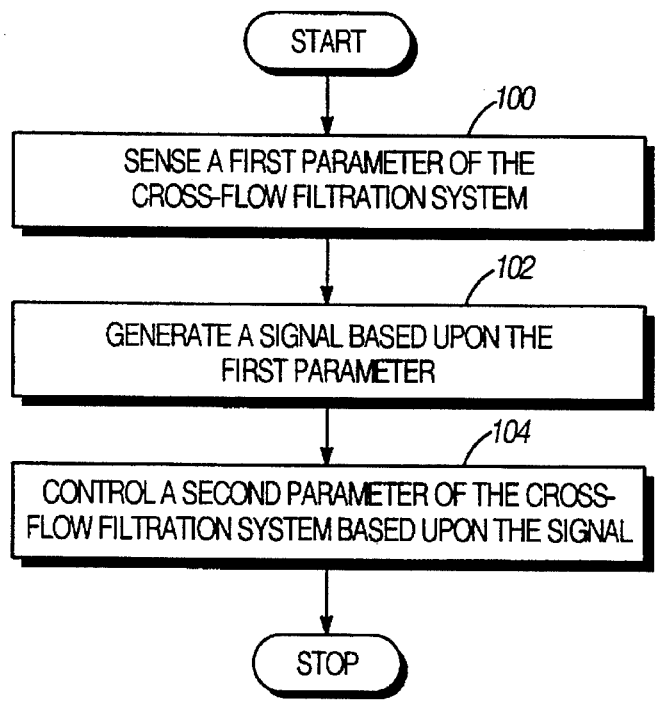
FIG. 4 is a flow diagram of an embodiment of a method of automatically controlling a cross-flow filtration system.

FIG. 4 is a flow diagram of an embodiment of a method of automatically controlling a cross-flow filtration system. As indicated by block 100, the method includes a step of sensing a first parameter of the cross-flow filtration system during operation thereof. The first parameter is either a flow rate of a slurry within a separation chamber, a speed at which a continuous filter medium is moving, a differential pressure between a first location within the separation chamber and a second location exterior to the separation chamber, an amount of the solid material deposited on the continuous filter medium, an amount of liquid material extracted from the slurry, a physical dimension of the solid material deposited on the continuous filter medium, or an amount of slurry which is transported back to a slurry-receiving input of the filtration system.

As indicated by block 102, the method includes a step of generating a signal based upon the first parameter. Preferably, the signal is either an analog or a digital electrical signal representative of the first parameter.

The method further includes a step of controlling a second parameter of the cross-flow filtration system in dependence upon the signal, as indicated by block 104. The step of controlling the second parameter typically includes steps of generating a control signal in dependence upon the signal, and applying the control signal to an input of the cross-flow filtration system.

Preferably, the second parameter is either the speed of the continuous filter medium, the pressure at either the first location or the second location, or the flow rate of the slurry within the separation chamber. Hence, the step of controlling typically includes a step of applying the control signal to an input of a motor which drives the continuous filter medium, to an input of a vacuum, or to an input of a valve, respectively, within the cross-flow filtration system. Preferably, the second parameter which is controlled differs from the first parameter which is sensed.

It is preferred that the steps indicated by blocks 100, 102, and 104 be performed repeatedly during operation of the cross-flow filtration system in order to automatically maintain a cross-flow condition within the separation chamber, and to automatically maintain a desired filtration rate.

Figure 5:
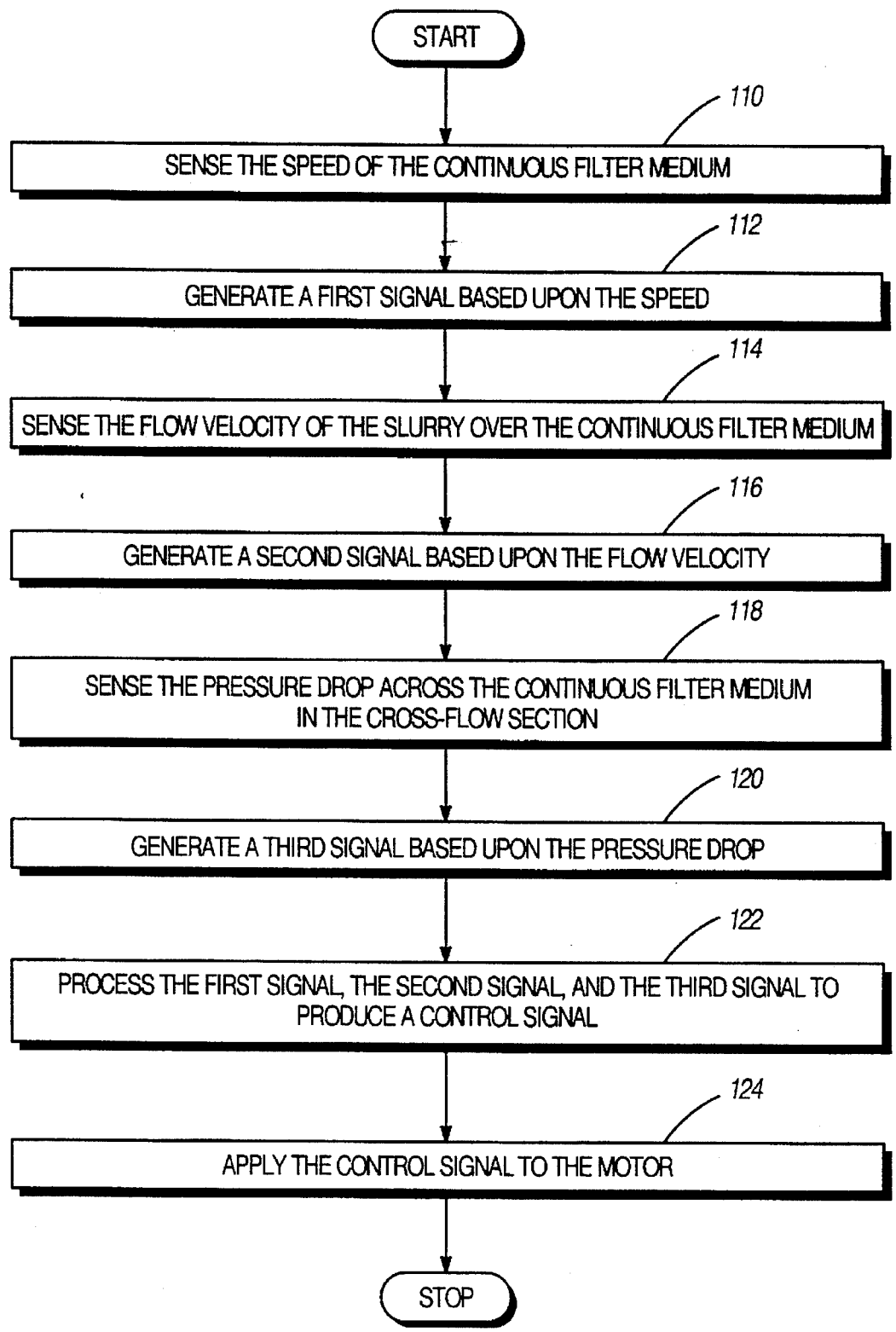
FIG. 5 is a flow diagram of another embodiment of a method of automatically controlling a cross-flow filtration system.

FIG. 5 is a flow diagram of another embodiment of a method of automatically controlling a filtration system. As indicated by block 110, the method includes a step of sensing the speed of a continuous filter medium. A step of generating a first signal representative of the speed of the continuous filter medium is performed as indicated by block 112.

As indicated by block 114, the method includes a step of sensing the flow velocity of the slurry over the continuous filter medium. It is preferred that the flow velocity of the slurry be sensed along an axis generally parallel to an axis along which the continuous filter medium is moving. A step of generating a second signal representative of the flow velocity of the slurry is performed, as indicated by block 116.

As indicated by block 118, the method optionally includes a step of sensing a pressure drop across the continuous filter medium in the cross-flow section of the separation chamber. A step of generating a third signal representative of the pressure drop is performed, as indicated by block 120.

As indicated by block 122, the method includes a step of processing the first signal, the second signal, and the third signal to produce a control signal. A step of applying the first control signal to an input of a motor which drives the continuous filter medium is performed as indicated by block 124.

The control signal commands the motor to drive the continuous filter medium at a speed within a predetermined range proportionate to the flow velocity of the slurry. The predetermined range may be defined, for example, by an upper bound which ensures a cross-flow condition and a lower bound which ensures a sufficient filtration rate. If the step of sensing the pressure drop is performed, the predetermined range is determined in dependence upon the pressure drop. By performing the above-described steps, both the cross-flow condition and the filtration rate are maintained for the filtration system.

Figure 6:
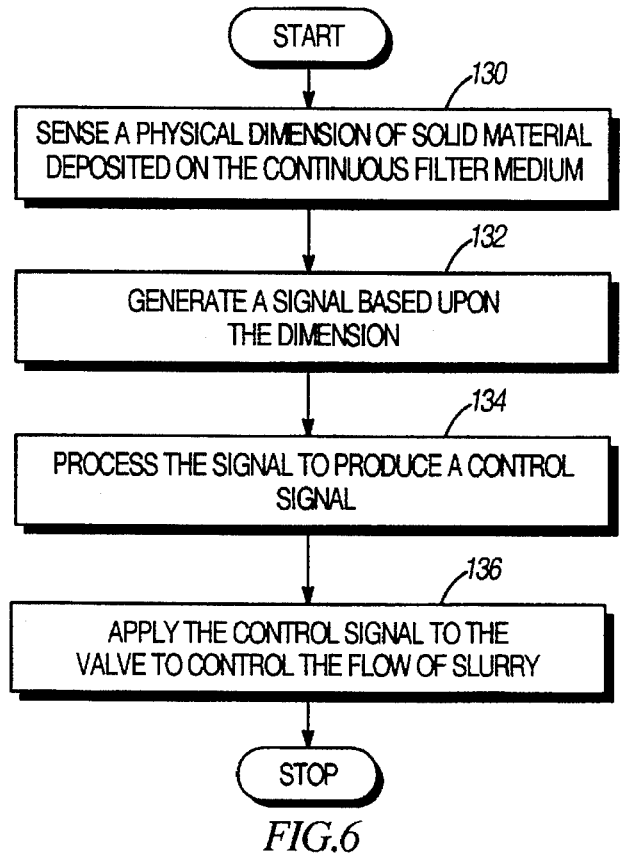
FIG. 6 is a flow diagram of a further embodiment of a method of automatically controlling a cross-flow filtration system.

FIG. 6 is a flow diagram of a further embodiment of a method of automatically controlling a cross-flow filtration system. The method includes a step of sensing a physical dimension of the solid material deposited on the continuous filter medium, as indicated by block 130. The physical dimension is sensed in proximity to the opening of the separation chamber through which the solid material exits. A step of generating a signal based upon the physical dimension is performed, as indicated by block 132.

The method further includes a step of processing the signal to produce a control signal, as indicated by block 134. A step of applying the control signal to a valve at a slurry-receiving input is performed, as indicated by block 136. The above-described steps are employed to control the flow rate of the slurry in order to regulate the physical dimension of the solid material deposited on the continuous filter medium. In particular, the physical dimension is regulated in accordance with the size of the opening of the separation chamber so that the slurry does not flow out of the opening, and the solid material does not build up in the separation chamber.

In one embodiment, the control signal commands the valve to reduce the flow rate of the slurry if the dimension is greater than or equal to a predetermined threshold. If the dimension is less than the predetermined threshold, the control signal commands the valve to increase the flow rate of the slurry. The predetermined threshold is based upon the size of the opening, and typically, is set approximately equal thereto.

Figure 7:
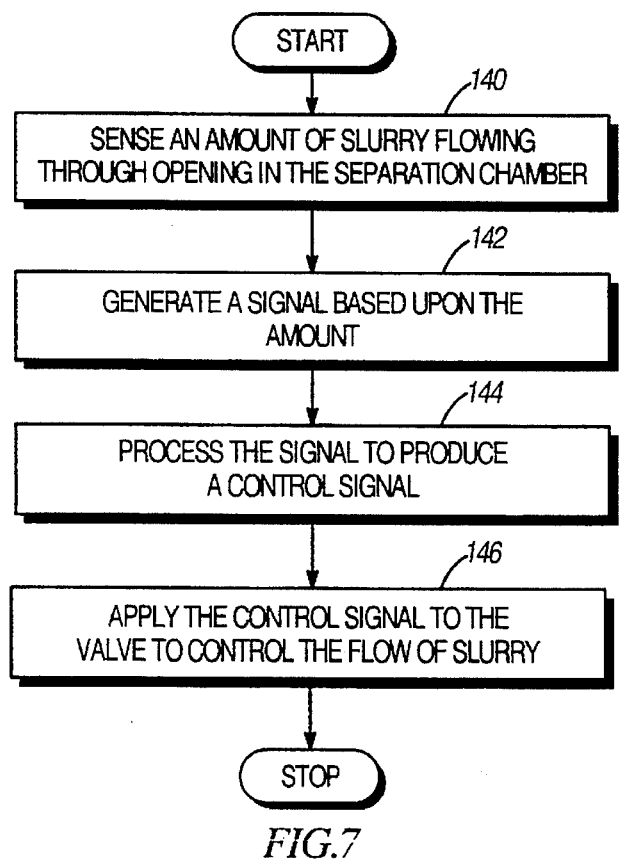
FIG. 7 is a flow diagram of a still further embodiment of a method of automatically controlling a cross-flow filtration system.

FIG. 7 is a flow diagram of a still further embodiment of a method of automatically controlling a cross-flow filtration system. The method includes a step of sensing an amount of slurry which flows through the opening in the separation chamber, as indicated by block 140. This is the slurry which must be transported back to a slurry-receiving input of the cross-flow filtration system. A step of generating a signal based upon the amount is performed, as indicated by block 142.

The method further includes a step of processing the signal to produce a control signal, as indicated by block 144. A step of applying the control signal to a valve at a slurry-receiving input is performed, as indicated by block 146. The above-described steps are employed to control the flow rate of the slurry in order to regulate the amount of slurry which flows through the opening of the separation chamber.

In one embodiment, the control signal commands the valve to reduce the flow rate of the slurry if the amount is less than or equal to a predetermined threshold. If the amount is greater than the predetermined threshold, the control signal commands the valve to increase the flow rate of the slurry. The predetermined threshold is based upon the size of the opening. Typically, the predetermined threshold is set approximately equal to, but slightly greater than, zero.

The methods described herein and used in the various embodiments of the present invention are performed using the processor 24 or the processor 80 as herein-described. The processors 24 and 80 can have a digital implementation using a microprocessor and a memory, wherein the microprocessor performs a series of programmed steps. Alternatively, the processors 24 and 80 can have an analog implementation using standard means for performing analog computations. The processors 24 and 80 may also be in the form of a custom integrated circuit, an application-specific integrated circuit (ASIC) or a programmable logic array.

The term slurry has been used throughout this description and should be broadly defined to include any combination of a fluid and solid components including, but not limited to, a sludge or suspension.

Thus, there has been described herein a concept, as well as several embodiments including a preferred embodiment of a method and a system for controlling a continuous medium filtration system.

Because the various embodiments of methods and systems for controlling the continuous medium filtration system as herein-described form a control signal based upon sensed parameters, they provide a significant improvement in being able to adapt the operation of the filtration system to changing conditions.

Additionally, the various embodiments of the present invention as herein-described sense two critical quantities, namely the speed of the continuous filter medium and the size of the opening of the separation chamber, so that operation of the filtration system can be quantified and optimized.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A method of controlling a cross-flow filtration system which receives a slurry and separates a solid material from a liquid material contained in the slurry, the cross-flow filtration system defining a separation chamber within which the solid material is deposited on a continuous filter medium, the continuous filter medium moving at a speed relative to the separation chamber, the cross-flow filtration system having a plurality of parameters which characterize its operation, the method comprising the steps of:

sensing a first parameter of the cross-flow filtration system during operation thereof wherein the first parameter is a differential pressure between a first location within the separation chamber and a second location exterior to the separation chamber;

generating a signal based upon the first parameter; and controlling the speed of the continuous filter medium based on the signal.

2. The method of claim 1 wherein the continuous filter medium includes a continuous loop belt.

3. The method of claim 1 wherein the second parameter differs from the first parameter.

4. The method of claim 1 wherein the first location is within a section of the separation chamber where the slurry flows at a speed generally greater than the speed at which the continuous filter medium is moving.

5. The method of claim 1 wherein the cross-flow filtration system includes a compartment adjacent to the continuous filter medium, the compartment receiving the liquid material from the separation chamber through the continuous filter medium, wherein the second location is within the compartment.

6. The method of claim 1 wherein the second parameter is the speed of the continuous filter medium.

7. The method of claim 1 further comprising the step of:

determining, in dependence upon the pressure difference, a range of speeds for the continuous filter medium to maintain a cross-flow filtration condition along a predetermined portion of the continuous filter medium;

wherein the speed of the continuous filter medium is controlled to be within the range of speeds.

8. The method of claim 7 wherein the range of speed is determined based on a predetermined filtration rate.

9. A method of controlling a cross-flow filtration system which receives a slurry and separates a solid material from a liquid material contained in the slurry, the cross-flow filtration system having a continuous filter medium on which the solid material is deposited, the continuous filter medium moving at a speed within the cross-flow filtration system, the cross-flow filtration system having a plurality of parameters which characterize its operation, the method comprising the steps of;

sensing at least one parameter of the cross-flow filtration system during operation thereof, wherein the at least one parameter includes a flow rate of the slurry over the continuous filter medium sensed along an axis generally parallel to an axis along which the continuous filter medium is moving and sensed along said medium at a region where the slurry flows at a speed greater than the speed at which the continuous filter medium is moving;

generating at least one signal based upon the at least one parameter; and controlling a second parameter of the cross-flow filtration system in dependence upon the at least one signal to maintain a cross-flow filtration condition along a predetermined portion of the continuous filter medium.

10. The method of claim 9 wherein the continuous filter medium includes a continuous loop belt.

11. The method of claim 9 wherein the at least one parameter includes a differential pressure between a first location and a second location separated by the continuous filter medium.

12. The method of claim 11 wherein the first location is proximate to a section of the continuous filter medium where the slurry flows at a speed generally greater than the speed at which the continuous filter medium is moving.

13. The method of claim 11 wherein the filtration system includes a compartment adjacent to the continuous filter medium, the compartment receiving the liquid material through the continuous filter medium, wherein the second location is within the compartment.

14. The method of claim 9 wherein the at least one parameter includes an amount of the solid material deposited on the continuous filter medium.

15. The method of claim 14 wherein the step of sensing the at least one parameter includes a step of sensing a physical dimension of the solid material deposited on the continuous filter medium.

16. The method of claim 15 wherein the second parameter is controlled to regulate the physical dimension of the solid material deposited on the continuous filter medium.

17. The method of claim 9 wherein the at least one parameter includes an amount of slurry which is transported back to a slurry-receiving input of the filtration system.

18. The method of claim 9 wherein the at least one parameter includes an amount of liquid material extracted from the slurry.

19. The method of claim 9 wherein the second parameter comprises the speed of the continuous filter medium.

20. The method of claim 19 wherein the speed of the continuous filter medium is controlled to be within a predetermined range proportionate to the flow rate of the slurry.

21. The method of claim 20 wherein the predetermined range includes an upper bound to substantially maintain the cross-flow filtration condition and a lower bound based on a predetermined filtration rate.

22. The method of claim 9 wherein the flow rate includes a flow velocity.

23. A method of controlling a cross-flow filtration system which receives a slurry and separates a solid material from a liquid material contained in the slurry, the cross-flow filtration system defining a separation chamber within which the solid material is deposited on a continuous filter medium, the cross-flow filtration system having a motor which drives the continuous filter medium at a speed relative to the separation chamber, the method comprising the steps of:

sensing the speed of the continuous filter medium;

generating a first signal representative of the speed;

sensing a flow velocity of the slurry over the continuous filter medium;

generating a second signal representative of the flow velocity;

sensing a pressure drop across the continuous filter medium;

generating a third signal representative of the pressure drop;

processing the first signal, the second signal, and the third signal to form a control signal; and applying the control signal to the motor.

24. A system comprising:

a cross-flow filtration system which receives a slurry and separates a solid material from a liquid material contained in the slurry, the cross-flow filtration system defining a separation chamber within which the solid material is deposited on a continuous filter medium, the continuous filter medium moving at a speed relative to the separation chamber, the cross-flow filtration system having a plurality of parameters which characterize its operation;

a sensor operative for sensing a first parameter of the cross-flow filtration system during operation thereof, the sensor generating a signal based upon the first parameter, wherein the first parameter is a flow rate of the slurry sensed along said continuous filter medium within the separation chamber; and means comprising a processor operatively associated with the sensor for producing a control signal in dependence upon the signal generated by the sensor which is applied to the cross-flow filtration system for controlling a second parameter thereof.

25. The system of claim 24 wherein the continuous filter medium includes a continuous loop belt.

26. The system of claim 24 wherein the second parameter differs from the first parameter.

27. The system of claim 24 wherein the sensor includes:

an electromagnet which generates a magnetic field transverse to an axis along which the flow rate of the slurry is sensed; and a voltage sensor which senses a voltage induced in the slurry, wherein the signal representative of the flow rate of the slurry is based upon the voltage.

28. The system of claim 24 wherein the second parameter is the speed of the continuous filter medium.

29. The system of claim 28 wherein the cross-flow filtration system includes a motor which drives the continuous filter medium, the motor having an input which receives the control signal from the processor.

30. The system of claim 28 wherein the speed of the continuous filter medium is controlled to be within a predetermined range proportionate to the flow rate of the slurry.

31. A system comprising: a filtration system which receives a slurry and separates a solid material from a liquid material contained in the slurry, the filtration system having a continuous, cross-flow filter medium on which the solid material is deposited, the continuous filter medium moving at a speed within the filtration system, the filtration system having a plurality of parameters which characterize its operation, the system further comprising:

at least one sensor operative for sensing at least one parameter of the filtration system during filtration, the at least one sensor generating at least one signal based upon the at least one parameter, wherein the at least one parameter sensed includes a differential pressure between a first location and a second location separated by the continuous filter medium; and means comprising a processor operatively associated with the at least one sensor for producing a control signal in dependence upon the at least one signal which is applied to the filtration system for controlling the speed of the continuous filter medium to maintain a cross-flow filtration condition within a predetermined section of the separation chamber.

32. The system of claim 31 wherein the continuous filter medium includes a continuous loop belt.

33. The system of claim 31 wherein the at least one parameter includes a parameter other than the speed of the continuous filter medium.

34. The system of claim 31 wherein the at least one parameter includes a flow rate of the slurry over the continuous filter medium.

35. The system of claim 34 wherein the flow rate of the slurry is sensed along an axis generally parallel to an axis along which the continuous filter medium is moving.

36. The system of claim 34 wherein the flow rate of the slurry is sensed at a region where the slurry flows at a speed generally greater than the speed at which the continuous filter medium is moving.

37. The system of claim 34 wherein the speed of the continuous filter medium is controlled to maintain a cross-flow filtration condition along a predetermined portion of the continuous filter medium.

38. The system of claim 34 wherein the at least one sensor includes:

an electromagnet which generates a magnetic field transverse to an axis along which the flow rate of the slurry is sensed; and a voltage sensor which senses a voltage induced in the slurry, wherein the flow rate of the slurry is based upon the voltage.

39. The system of claim 34 wherein the speed of the continuous filter medium is controlled to be within a predetermined range proportionate to the flow rate of the slurry.

40. The system of claim 31 wherein the at least one sensor includes a pressure sensor for sensing a pressure exerted by the slurry on the continuous filter medium.

41. The system of claim 31 wherein the first location is proximate to a section of the continuous filter medium where the slurry flows at a speed generally greater than the speed at which the continuous filter medium is moving.

42. The system of claim 31 wherein the filtration system includes a compartment adjacent to the continuous filter medium, the compartment receiving the liquid material through the continuous filter medium, wherein the second location is within the compartment.

43. The system of claim 42 wherein the at least one sensor includes a pressure sensor for sensing a pressure within the compartment.

44. The system of claim 31 wherein the speed of the continuous filter medium is controlled to maintain a cross-flow filtration condition along a predetermined section of the continuous filter medium.

45. The system of claim 31 wherein the at least one parameter includes an amount of the solid material deposited on the continuous filter medium.

46. The system of claim 45 wherein the at least one sensor includes a displacement sensor which senses a physical dimension of the solid material deposited on the continuous filter medium.

47. The system of claim 46 wherein the speed of the continuous filter medium is controlled to regulate the physical dimension of the solid material deposited on the continuous filter medium.

48. A system comprising:

a cross-flow filtration system which receives a slurry and separates a solid material from a liquid material contained in the slurry, the cross-flow filtration system defining a separation chamber within which the solid material is deposited on a continuous filter medium, the continuous filter medium moving at a speed relative to the separation chamber, the continuous filter medium driven by a motor having an input;

a plurality of sensors operative for sensing a plurality of parameters of the cross-flow filtration system during operation thereof, the plurality of parameters sensed selected from the group consisting of the speed of the continuous filter medium, a flow rate of the slurry within the separation chamber, and a differential pressure between a first location within the separation chamber and a second location exterior to the separation chamber, the plurality of sensors generating a plurality of signals based upon the plurality of parameters; and means comprising a processor operatively associated with each of the plurality of sensors and the motor for producing a control signal in dependence upon the plurality of signals, wherein the control signal is applied to the input of the motor to maintain a cross-flow filtration condition within a predetermined section of the separation chamber.

* * * * *